United States Patent [19]

Calder et al.

[11] 4,142,801

[45] Mar. 6, 1979

[54] SPECTRAL COLOR GENERATOR

[76] Inventors: William E. Calder; William L. Robertson, both of 1381 Palm Ave., San Diego, Calif. 92154

[21] Appl. No.: 728,754

[22] Filed: Oct. 1, 1976

Related U.S. Application Data

[63] Continuation-in-part of Ser. No. 536,342, Dec. 26, 1974, Pat. No. 3,994,597.

[51] Int. Cl.$^2$ ............................................. G02B 23/10
[52] U.S. Cl. ................................... 356/251; 362/231
[58] Field of Search ............... 73/398 AR; 340/380, 340/285, 229; 356/219, 222, 234; 350/96 R, 169; 362/231

[56] References Cited

U.S. PATENT DOCUMENTS

| | | | |
|---|---|---|---|
| 2,672,602 | 3/1954 | Rees | 340/285 X |
| 2,867,916 | 1/1959 | Birdseye | 340/380 X |
| 3,143,300 | 8/1964 | Kunins | 362/231 |
| 3,228,026 | 1/1966 | Coronado-Arce | 340/380 X |
| 3,437,804 | 4/1969 | Schaefer et al. | 350/96 R X |
| 3,532,873 | 10/1970 | Batson et al. | 350/96 R |
| 3,984,676 | 10/1976 | Barbieri | 340/285 X |

*Primary Examiner*—John K. Corbin
*Assistant Examiner*—Scott J. Sugarman
*Attorney, Agent, or Firm*—Brown & Martin

[57] ABSTRACT

A spectral color generator is used in an optical sight for use as a gun sight, surveying instrument, or the like, with means for projecting light from the generator in the form of an illuminated reticle into the line of sight. The illumination from the generator is variable in color and intensity for maximum visibility against a variety of backgrounds, and means are provided for precise alignment, adjustment for elevation and windage and for levelling. In its basic form, the sight has long eye relief but is readily adaptable for use with telescopic attachments. The spectral color generator is also illustrated in an operational monitoring system responsive to sensing devices for monitoring a plurality of parameters including opacity and pressure.

18 Claims, 14 Drawing Figures

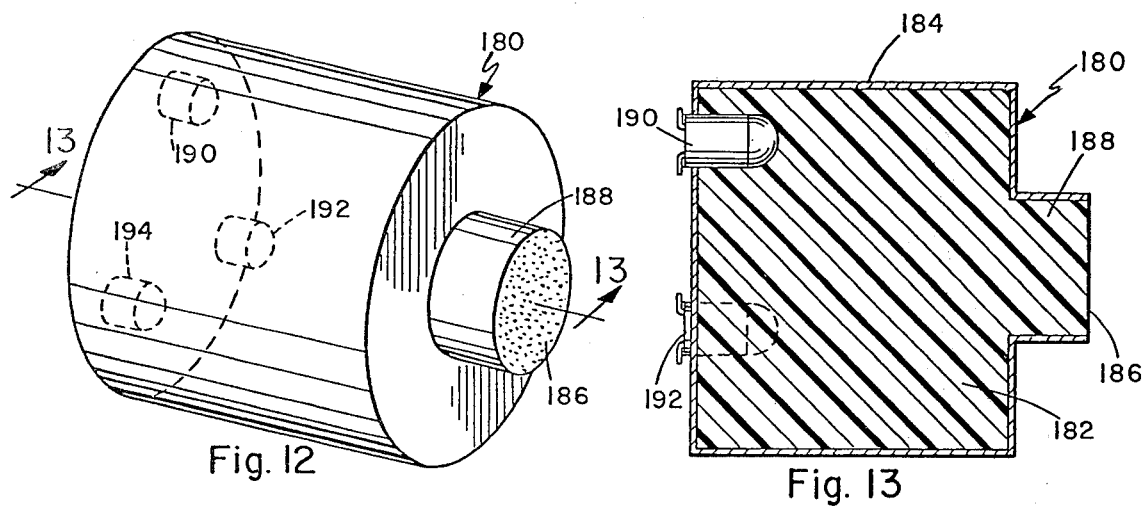
Fig. 12
Fig. 13
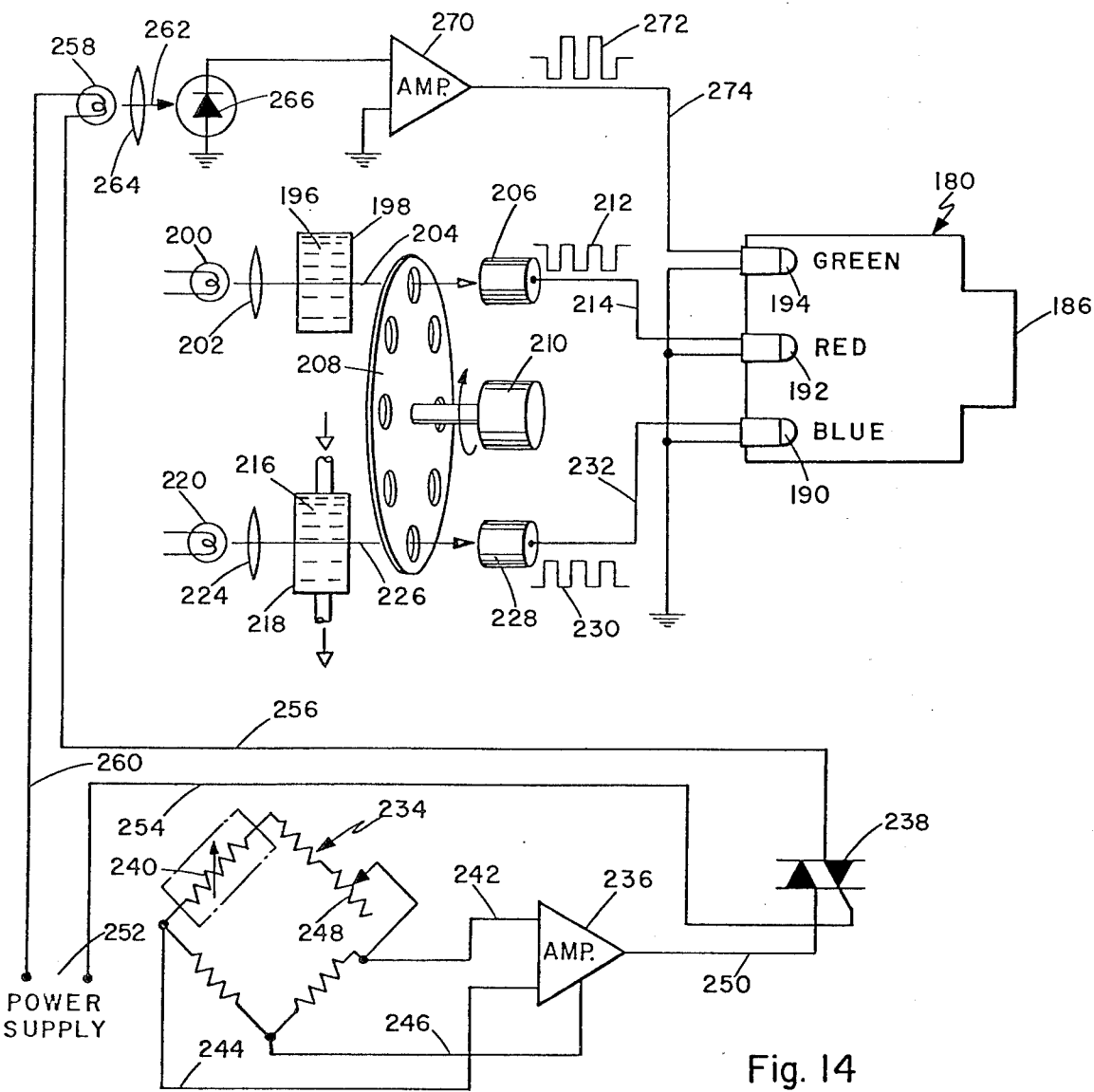
Fig. 14

SPECTRAL COLOR GENERATOR

REFERENCE TO RELATED APPLICATIONS

The present application is a continuation-in-part of co-pending application, Ser. No. 536,342 filed Dec. 26, 1974 entitled Optical Sight With Variable Illumination, now U.S. Pat. No. 3,994,597.

BACKGROUND OF THE INVENTION

The use of colored lights as indicators in monitoring systems is well known. These lights, however, are generally an incandescent lamp of a single color and can be used to indicate two conditions at most. Red lights, for example, are commonly used to indicate danger or malfunction, and are generally connected so that absence of a light indicates the system is functioning normally and the presence of the light indicates a failure of the system.

This has the obvious disadvantage of requiring a separate light for each element of the system monitored. This can result in a confusing array of lights where many functions of a complicated system must be monitored.

It would be advantageous to have a single indicator light capable of indicating the condition of many separate elements of a system. It would also be advantageous to have a single light capable of generating any color of the spectrum.

SUMMARY OF THE INVENTION

In accordance with the primary aspect of the present invention, a spectral color generator includes a housing having light output means such as a translucent window, a plurality of light emitting elements each having a light output of a distinct color different from the other, means for combining the light outputs, and control means for controlling the output intensity of the light emitting elements. The control means for controlling the output intensity can take any number of forms such as manual adjusting means, or sensing means for sensing conditions, etc.

The primary object of this invention, therefore, is to provide a new and improved spectral color generator.

Another object of this invention is to provide a spectral color generator, the illumination output of which is variable in color and intensity.

Another object of this invention is to provide a color generator having control means responsive to sensing means for varying the color and intensity of the output from the generator.

Other objects and advantages will be apparent from the following detailed description, taken in conjunction with the accompanying drawings, in which:

FIG. 12 is a perspective view of the spectral color generator unit.

FIG. 13 is a sectional view taken on line 13—13 of FIG. 12.

FIG. 14 illustrates schematically a typical use of the color generator.

DESCRIPTION OF THE PREFERRED EMBODIMENTS

Figure 1:
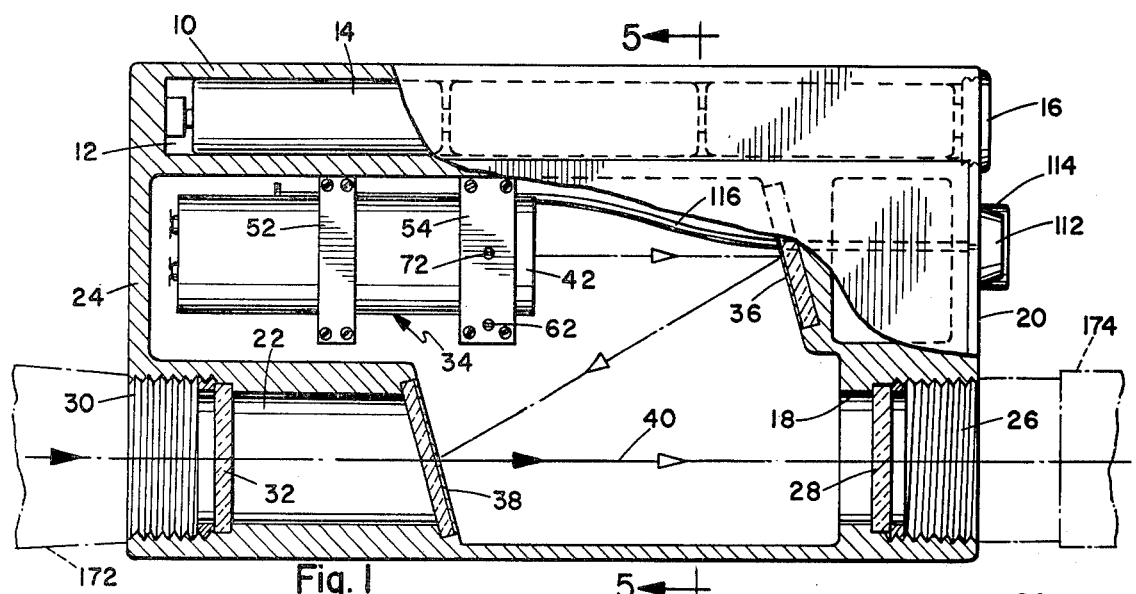
FIG. 1 is a side elevation view of the color generator in a gun sight, with portions cut away.
Figure 2:
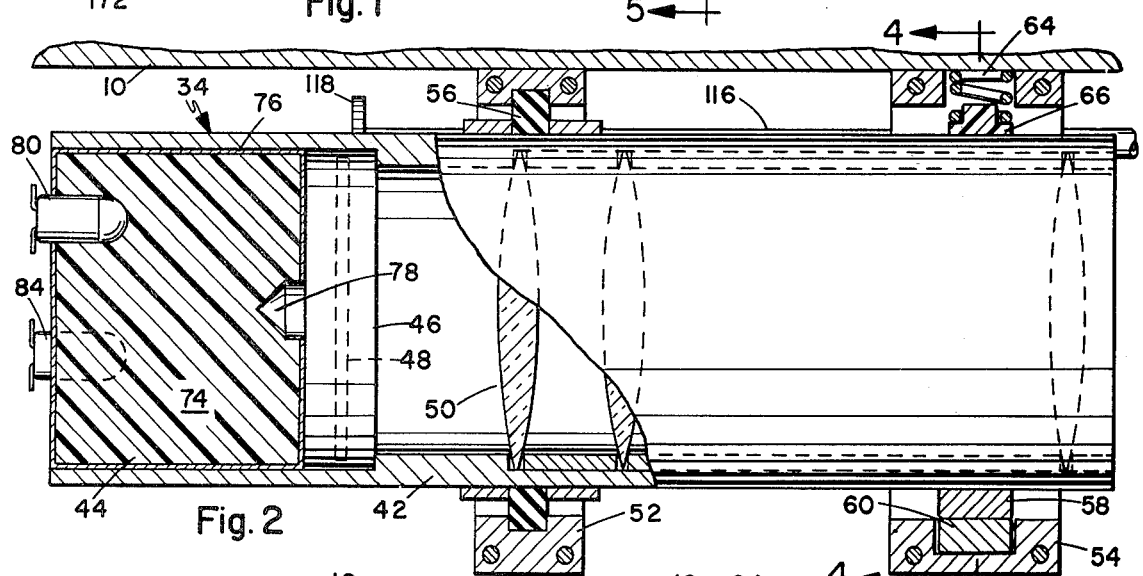
FIG. 2 is an enlarged side elevation view, partially cut away, of the color generator and projector unit.
Figures 3, 4:
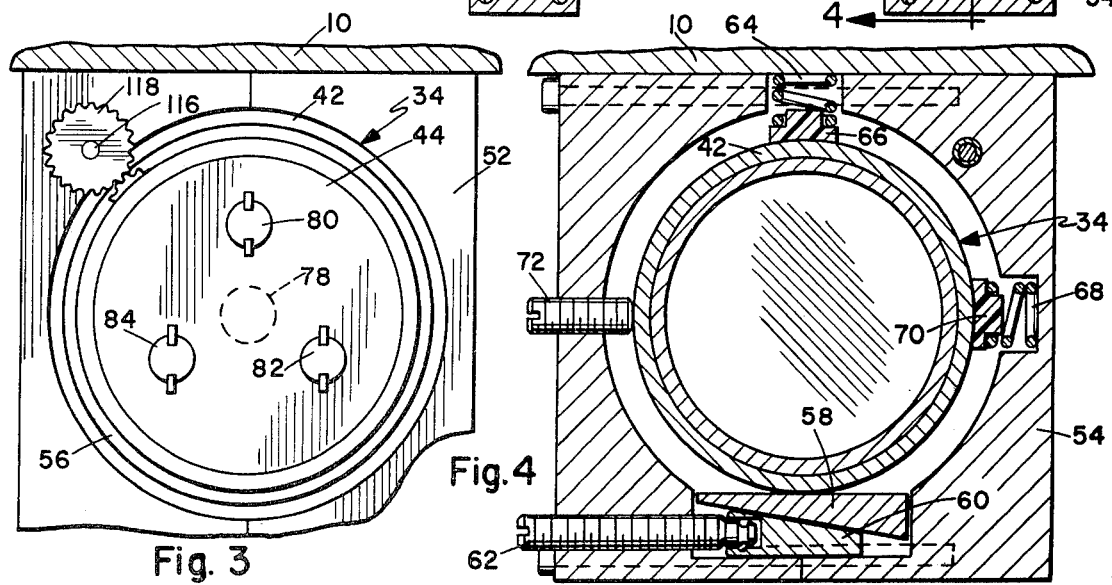
FIG. 3 is an end elevation view as taken from the left hand end of FIG. 2.
FIG. 4 is a sectional view taken on line 4—4 of FIG. 2.
Figure 5:
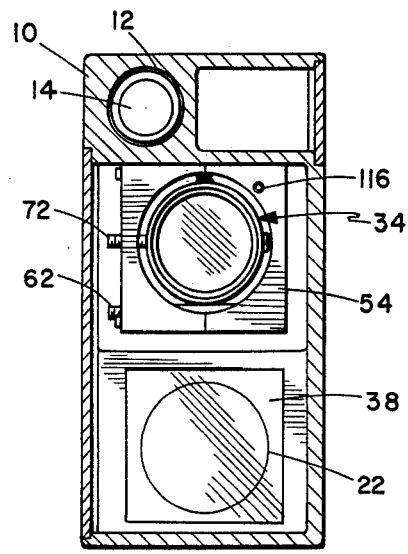
FIG. 5 is a sectional view taken on line 5—5 of FIG. 1.
Figure 6:
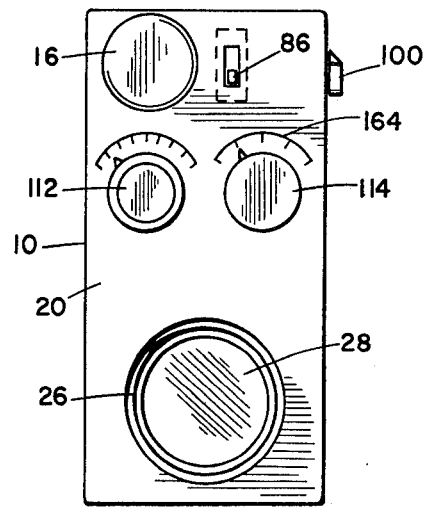
FIG. 6 is an end elevation view as taken from the right hand end of FIG. 1.
Figure 7:
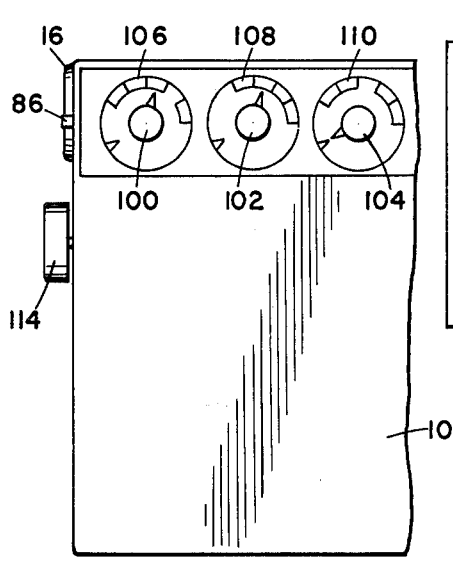
FIG. 7 is a side elevation view of a portion of the side opposite to that shown in FIG. 1.

The basic optical sight, illustrated in FIGS. 1 through 11, is completely contained in a substantially rectangular housing 10 of any suitable construction. In the upper portion of housing 10 is a cylindrical cavity 12 to hold batteries 14 for operating the sight, the batteries being retained by a cap 16. In the lower portion of the housing is an eyepiece opening 18 at rear end 20 and an objective opening 22 at the front end 24, the openings being axially aligned through the length of the housing. Eyepiece opening 18 has a threaded socket 26 and is closed by a transparent window 28. Objective opening 22 has a threaded socket 30 and is similarly closed by a transparent window 32, to seal the unit from ingress of foreign matter.

Inside the forward upper portion of housing 10 is a projector 34, mounted to project a reticle image to a front surface mirror 36 fixed in the upper rear portion of the housing. Mirror 36 is inclined to reflect the image forward and downward to a partially reflective beam splitter 38 fixed over the inner end of objective opening 22. Beam splitter 38 allows a target to be viewed along optical axis 40 and is inclined to reflect the reticle image through eyepiece opening 18 along the same optical axis. In FIG. 1, the target image path is indicated by solid arrows and the reticle image path by outlined arrows.

Projector 34 is contained in a cylindrical tube 42, at the front end of which is a light source 44. Immediately behind the light source is an iris unit 46 containing a multiple leaf diaphragm 48 of variable aperture, suitable diaphragm units being readily available. The rear portion of the tube 42 contains a collimating lens system 50 for projecting an image at apparent infinity, the optical arrangement being well known.

Tube 42 is suspended from the housing 10 in a support frame 52 and an adjustment frame 54. In the support frame, the tube is held by a support ring 56 of hard rubber, plastic, or similar material, which provides firm support but has sufficient resiliency to allow angular adjustment in a very small range of motion. In the adjustment frame 54, the tube rests on a support wedge 58, which rides on an adjustment wedge 60, the adjustment wedge being moved by an elevation adjustment screw 62 projecting from the side of the frame. A spring 64 engages a stud 66 on top of tube 42 to hold the tube down on the wedges and allow for vertical adjustment. Another spring 68 engages a stud 70 on the side of tube 42 to bias the tube against an azimuth adjustment screw 72, which also projects from the side of frame 54. By means of screws 62 and 72 the projector can be precisely aligned relative to the optical axis. The adjustable mounting for the projector is an example of a suitable arrangement and other such means may be used, depending on the range of adjustment required.

Light source 44 comprises a cylindrical block 74 of plastic, covered by a reflective coating 76. In the rear or inner end surface of block 74 is a conical cavity 78 with a slightly roughened surface which acts as a diffuser. When cavity 78 is illuminated from within block 74, the cavity becomes an illuminated spot which is the center of the reticle image. It is this spot which is projected into the optical path and appears to rest on the target as viewed.

To obtain the required control of color in the illumination, pure light sources are needed. This is accomplished by using LED's (light emitting diodes) which have a stable monochromatic light output at any intensity. Three LED's 80, 82 and 84 are recessed into the front or outer end of block 74, the reflective coating 76 causing the entire light output to be directed by multiple reflections to the only outlet, the cavity 78. The LED's are selected to emit in the three primary colors, red, green and blue, which can be mixed to provide any desired color and white light.

Figure 11:
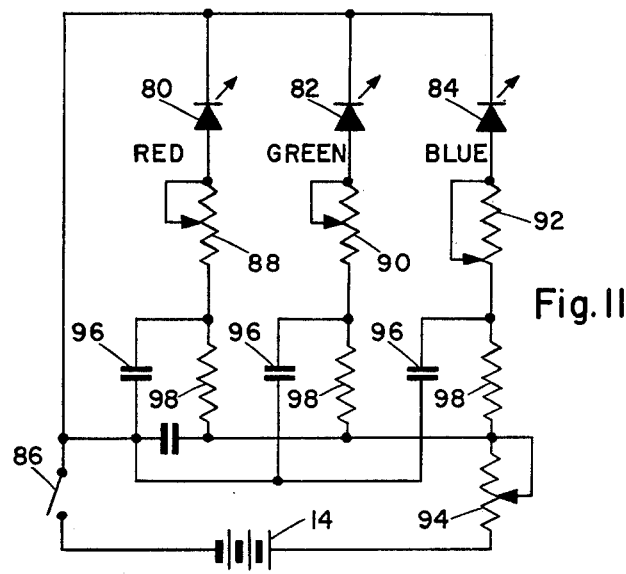
FIG. 11 is a schematic diagram of one embodiment of the illumination control system.

A simple wiring diagram for the device is illustrated in FIG. 11. Batteries 14 are connected through an ON-/OFF switch 86 to one side of each of the LED's 80, 82 and 84, the other sides of the LED's being connected through potentiometers 88, 90 and 92, respectively, back to the batteries. An additional intensity control potentiometer 94 is installed in the common return connection to the batteries, to control overall intensity without affecting the individual LED settings. Each LED is also protected by a decoupling capacitor 96 and resistor 98, the circuitry being well known. Since the light output of an LED is not linear relative to the energization voltage, the potentiometers are preferably of the "tapered" type in inverse relation to the LED output curve, so that actual intensity is substantially linear on a convenient control. As illustrated, the potentiometers are provided with control knobs 100, 102 and 104, which are arranged along one side of housing 10 and read against color coded dials 106, 108 and 110, respectively, for selective setting of the LED's. Switch 86 and a knob 112 for intensity control potentiometer 94 are shown as being on the housing rear end 20, but any convenient control arrangement may be used.

Figure 8:
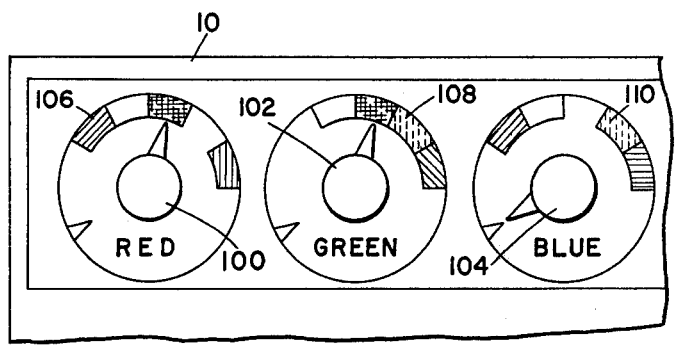
FIG. 8 is an enlarged view of the illumination controls shown in FIG. 7.

As illustrated by the control positions in FIGS. 8 and 11, the output of the red and green LED's is substantially equal, while the blue output is zero. The resultant light is yellow, which is the color of the projected reticle spot. For convenience, the dials may be colored in sections for the resultant colors, so that one, two, or three knobs can be set to the desired color to obtain the proper mix which will be most visible against a particular background.

For simple control of the iris unit 46, a knob 114 is mounted on the housing rear end 20 and is connected by a flexible drive 116 to a gear 118, which rotates the diaphragm control. Other suitable means may be used, depending on the type of iris structure used.

Figure 9:
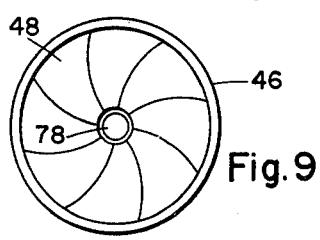
FIG. 9 is a view of the iris diaphragm exposing the entire illuminated spot.
Figure 10:
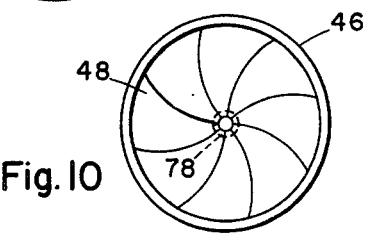
FIG. 10 is a view of the iris closed to reduce the spot size.

In FIG. 9, the diaphragm 48 is shown as being opened sufficiently to expose the entire cavity 78, so that the projected spot is at its maximum size. Under certain conditions, it may be found that the spot will obscure a small target. In this event the diaphragm may be closed, as in FIG. 10, to reduce the effective size of the spot as it is projected. Only the back lighted image of the spot appears in the line of sight, the diaphragm not being visible.

A modified form of the signal generator and a further illustration of the fabrication is disclosed in FIGS. 12 through 14. The colored generator of this embodiment generally designated by the numeral 180 comprises a generally cylindrical transparent plastic block 182 which can be generally referred to as a housing which is covered by a reflective coating 184. The housing includes light output means in the form of a window 186 having a roughened surface which acts as a diffuser and thus, becomes essentially a translucent window. In this embodiment, the translucent window is formed on the end of a reduced diameter cylindrical portion 188 of the housing. This reduced portion of the cylindrical block permits the mounting of the device in a control panel such that the window 186 extends beyond the surface thereof.

The required color generating means as in the previous embodiment comprises a plurality of pure light sources. As in the previous embodiment, a plurality of LED's (light emitting diodes) which have a stable monochromatic light output are used.

Three LED's 190, 192 and 194 are recessed into the end of the block 182 opposite the window 186. The reflected coating 184 on the block 182 causes the light output from these LED's to be reflected by multiple reflections to the only outlet which is the window 186. The LED's are selected to emit in the three primary colors, red, green and blue, which can be mixed to provide any desired color and white light also. The light emitted by the LED's when electrically excited is spectrally pure regardless of the intensity of the current flow through them. However, the intensity varies with the flow of current through them such that the greater the current, the brighter the light and the lesser the current, the dimmer the light. Thus, by varying the illumination levels of the LED's they generate the various colors of the rainbow. Controlling the levels of the LED illumination provides a control of the color.

The spectral color generator may be used for many different purposes, such for signalling, indicating, analytical, or diagnostic device. The generator may be used, for example, as an indicating device to measure opacity, viscosity, pressure, temperature, time, specific gravity, acidity, speed and a large number of other parameters. A suitable sensor is required for each parameter to be measured and tied in with means for controlling the various LED's.

Referring now to FIG. 14, there is illustrated an example of a spectral color generating means used as an indicating device equipped with sensors for measuring opacity against a reference standard and for measuring pressure. This system may be used, for example, to monitor liquid flow through a plant, such as a refining plant.

Turning now to FIG. 14, the spectral generator 180 is tied in and used as an indicator for a fuel processing system. Assuming, for example, that a liquid is to be treated such as by refining to meet a certain standard, a reference sample of liquid 196 is placed within a transparent container 198. A source of light such as a lamp or light bulb 200 and a lens 202 directs a beam 204 of light through a sample 196 in a reference cell. The beam of light then falls upon an optioelectric device or optical electric detector 206 of the type containing an amplifier wherein the output corresponds to light intensity such as, for example, a unit identified as an RCA 3062. The light beam is chopped by a chopper disc 208 driven by suitable motor 210. The chopped light beam in falling upon a detector 206 results in an output of amplified electrical pulses from the optical electric detector 206 in a wave form 212 which is then transmitted by suitable conductor 214 to the red LED 192.

A sample of the process fluid 216 is flowed through a test cell such as a transparent chamber 218. Light from a second light source including a lamp or light bulb 220 directs a beam through a focusing lens 224, which beam 226 passes through a sample and is directed upon a second optical electric detector 228. This light beam 226 is likewise chopped by the rotating chopper disc 208 into pulses, such that the light causes an electrical output from the optical electric detector 228 in the form of a pulse signal such as 230, which is communicated by a conductor 232 to the blue LED 190. Since the intensity of the light falling upon the detectors 206 and 228 will depend upon the opacity of the liquid 196 and 216, any variation thereof will transmit a variation in intensity between the red LED 192 and the blue LED 190. Thus, a change in intensity of these will vary the color output at 186.

Since the system utilizes pump pressure for forcing the fluid 216 through the system, the pressure in the system may be monitored also by a suitable system illustrated. This pressure monitoring system includes an electrical circuit with pressure sensing means in the form of a standard sensing circuit or bridge circuit generally indicated by the numeral 234, which is connected to a differential amplifier 236, which controls the switching of a TRIAC 238. The amplifier 236 may be any suitable device, such as an I.C. amplifier identified as a CA 3094B. The sensing circuit 234 may be of the bridge type circuit such as illustrated having a resistance 240 which varies with pressure acting thereon establishing, for example, a positive resistant coefficient with a differential resistance acting by way of conductors 242, 244, and 246 on the differential amplifier 236. Suitable means such as a variable resistance or adjustable resistance 248 may be provided in the bridge for adjusting the sensing means.

The amplifier 236 acts through conductor means 250 on the TRIAC 238. The TRIAC 238 provides switching action for controlling the conduction of power from a power supply 252 which is connected by conductors 254 and 256 through the TRIAC 238 to a lamp 258 and directly by conductor 260 to the lamp 258. With this circuit, the intensity of the lamp 258 will vary with pressure acting on the pressure sensing means 234, with the result that a light beam 262 focused through a suitable lens 264 on a conventional photodiode 266, will act through conductor 268 on amplifier 270. The electrical signal from the photodiode 266 will be amplified by the amplifier 270 and transmitted as pulses such as in the form 272, along conductor 274 to the green LED 194.

The following parameters are then entered into the color signal generator: reference liquid opacity; refined liquid opacity; liquid or pump pressure.

As these parameters vary, the spectral color generator indicating instrument will display the effect of the variation on its frosted glass face 186 as follows:

| Color of Indicator Face | Meaning |
| --- | --- |
| WHITE illuminated | All systems go. |
| RED illuminated | Low fluid pressure, and dirty, or more opaque fluid. |
| GREEN illuminated | Fluid pressure okey, but fluid |

-continued

| Color of Indicator Face | Meaning |
| --- | --- |
| | more opaque than desired or reference cell malfunction. |
| YELLOW illuminated | Refined fluid too opaque, but other parameters okey. |
| MAGENTA illuminated | Reference cell or "chopper" encoder malfunction. Other parameters okey. |
| VIOLET illuminated | Low fluid pressure, but all other parameters okey. |

Thus, many combinations of parameters can be conveniently displayed on the face of the spectral color generator indicating means. These parameters also serve, when displayed, to analyze the functions of the associated machinery and/or diagnose malfunctions therein.

While the present invention has been described by means of specific embodiments, it is to be understood that numerous changes and modifications may be made therein without departing from the spirit and scope of the invention, as defined in the appended claims.

Having described our invention, We now claim:

1. A spectral color generator comprising:

housing means having light output means and a light source including a plurality of individual light emitting diodes each having a light output of a distinct primary color different from the others;

means including a block of transparent material for combining the outputs of said light emitting diodes at least at said light output means for producing an output color;

and illumination control means including a source of electrical power connected to each diode and means for varying the power to each diode for infinitely varying the output intensity of each of said individual light emitting diodes while maintaining color purity for thereby varying the output color.

2. A spectral color generator according to claim 1, wherein said means for combining comprises a translucent surface in said one end of the block.

3. A spectral color generator according to claim 2, wherein said reflective coating covers the entire outer surface of the block except for said translucent surface.

4. A spectral color generator according to claim 1, wherein said block of transparent material has a reflective outer coating, said output means being at one end of said block and said light emitting diodes being inset in spaced relation in the other end of the block.

5. A spectral color generator comprising:

housing means having light output means and a light source including a plurality of individual light emitting elements each having a light output of a distinct color different from the others;

means for combining the outputs of said light emitting elements at least at said light output means for producing an output color;

and illumination control means for infinitely varying the output intensity of each of said individual light emitting elements while maintaining color purity for thereby varying the output color, said illumination control means comprising sensing means.

6. A spectral color generator according to claim 5, comprising separate sensing means connected to each light emitting element.

7. A spectral color generator according to claim 6, wherein at least one of said separate sensing means functions to generate an electrical signal.

8. A spectral color generator according to claim 7, including amplifier means for amplifying said electrical signal.

9. A spectral color generator according to claim 6, wherein at least one of said separate sensing means functions to control an electrical signal.

10. A spectral color generator comprising:
housing means having light output means and a light source including a block of transparent material having a reflective outer coating, said output means being at one end of said block, a plurality of individual light emitting diodes each having a light output of a distinct primary color different from the others inset in spaced relation in the other end of the block,
a translucent surface in said one end of the block for combining the outputs of said light emitting diodes at least at said light output means for producing an output color;
and illumination control means for infinitely varying the output intensity of each of said individual light emitting diodes while maintaining color purity for thereby varying the output color,
wherein said illumination control means comprises sensing means.

11. The spectral color generator according to claim 10, comprising separate sensing means connected to each light emitting diode.

12. The spectral color generator according to claim 11, wherein at least one of said separate sensing means functions to generate an electrical signal.

13. The spectral color generator according to claim 12, including amplifier means for amplifying said electrical signal.

14. The spectral color generator according to claim 12, wherein said sensing means is pressure responsive.

15. The spectral color generator according to claim 12, wherein said sensing means is light responsive.

16. The spectral color generator according to claim 11, wherein at least one of said separate sensing means functions to control an electrical signal.

17. The spectral color generator according to claim 11, wherein said sensing means is pressure responsive.

18. A spectral color generator comprising:
housing means having light output means and a light source including a block of transparent material having a reflective outer coating, said output means being at one end of said block, a plurality of individual light emitting elements each having a light output of a distinct color different from the others, said light emitting elements being inset in spaced relation in the other end of the block;
a translucent surface in said one end of the block for combining the outputs of said light emitting elements at least at said light output means for producing an output color;
and illumination control means for infinitely varying the output intensity of each of said individual light emitting elements while maintaining color purity for thereby varying the output color; and
said light emitting elements are light emitting diodes having light outputs of primary colors, illumination control means comprises separate sensing means connected to each light emitting diode, at least one of said separate sensing means functions to generate an electrical signal, at least one of said separate sensing functions to control an electrical signal,
amplifier means for amplifying the generated electrical signal,
one of said sensing means is pressure responsive, the other of said sensing means is light responsive.

* * * * *